(12) United States Patent
Zhang et al.

(10) Patent No.: US 10,523,246 B1
(45) Date of Patent: Dec. 31, 2019

(54) APPARATUS AND METHODS FOR A CONFIGURABLE WIRELESS COMMUNICATION CHIP

(71) Applicant: Marvell International Ltd., Hamilton (BM)

(72) Inventors: Hongyuan Zhang, Fremont, CA (US); Sergey Timofeev, Mountain View, CA (US); Lance Nagamine, Fremont, CA (US); Tsunglun Yu, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 16/144,595

(22) Filed: Sep. 27, 2018

Related U.S. Application Data

(60) Provisional application No. 62/630,114, filed on Feb. 13, 2018.

(51) Int. Cl.
*H04B 1/00* (2006.01)
*H04B 7/0413* (2017.01)
*H04B 7/0404* (2017.01)
*H04W 88/06* (2009.01)

(52) U.S. Cl.
CPC ............ *H04B 1/005* (2013.01); *H04B 7/0404* (2013.01); *H04B 7/0413* (2013.01); *H04W 88/06* (2013.01)

(58) Field of Classification Search
CPC .... H04B 1/005; H04B 7/0404; H04B 7/0413; H04W 88/06
See application file for complete search history.

(56) References Cited

U.S. PATENT DOCUMENTS

| | | | | |
|---|---|---|---|---|
| 2012/0046000 A1* | 2/2012 | Gao | ...................... | H04W 72/02 455/73 |
| 2013/0109325 A1* | 5/2013 | Afsahi | ................. | H04B 7/0689 455/73 |
| 2015/0280777 A1* | 10/2015 | Azizi | ................... | H04B 1/7143 370/330 |

\* cited by examiner

*Primary Examiner* — Jaime M Holliday

(57) ABSTRACT

The present disclosure describes apparatuses and methods for a configurable wireless communication chip. In some aspects, a wireless communication chip includes multiple radio paths and is capable of operating in a first communication mode that supports communication in non-contiguous segments of bandwidth and a second communication mode that does not support communication in non-contiguous segments of bandwidth. Based on a hardware configuration external to the wireless communication chip, the radio paths can be configured to operate in the first communication mode or the second communication mode. In some cases, the hardware configuration external to the wireless communication chip includes fewer antennas or amplifier paths than radio paths of the chip, such as due to cost or form-factor considerations. In such cases, the wireless communication chip can operate in the second communication mode to implement advanced communication techniques with reduced hardware, enabling flexibility to design lower cost or smaller devices.

20 Claims, 9 Drawing Sheets

Non-Contiguous 80 MHz + 80 MHz  208

Contiguous 80 MHz + 80 MHz (160 MHz)  214

APPARATUS AND METHODS FOR A CONFIGURABLE WIRELESS COMMUNICATION CHIP

CROSS REFERENCE TO RELATED APPLICATION

This present disclosure claims priority to U.S. Provisional Patent Application Ser. No. 62/630,114 filed Feb. 13, 2018, the disclosure of which is incorporated by reference herein in its entirety.

BACKGROUND

Many electronic devices communicate wirelessly with other devices or a network controller of a wireless network though which various resources are available, such as the Internet. Typically, amounts of data communicated by different devices through the wireless network vary based on content accessed by a device, services provided by the device, user-related activity on the device, and the like. To manage access of the wireless network, the network controller allocates respective portions of physical resources to each device by which the device accesses the wireless network and the resources thereof. For a device that communicate large amounts of data (e.g., multimedia streaming), the network controller may assign large portions of bandwidth or multiple portions of bandwidth to support data rates sufficient to communicate all of this data.

Supporting wireless communication over large portions of bandwidth or multiple portions of bandwidth, however, typically requires that a network controller include complex radio module and associated circuitry. For example, some network controllers include a radio module capable of multiple-input multiple-output (MIMO) communication in which multiple streams of information are transmitted to or received from another device. To achieve maximum data rates, each stream of MIMO communication requires that the network controller also include a dedicated power amplifier to amplify signals for transmission and a low-noise amplifier to amplify received signals, both of which increase complexity, power consumption, and cost of the network controller. Few devices of a wireless network, however, actually communicate at or near these maximum data rates, so many users may not benefit from the increased complexity, power consumption, or cost of the network controller's MIMO radio module and associated circuitry. Additionally, some network controllers may have form factor or cost limitations that preclude the use of multiple dedicated antennas for each stream of MIMO communication, resulting in underutilization of capabilities of an expensive full-featured MIMO radio module.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method is implemented by a wireless communication chip to determine, based on a hardware configuration of a device in which the wireless communication chip is embodied, that the wireless communication chip is to operate in one of a first or second communication mode. The first communication mode supports communication in non-contiguous segments of bandwidth and the second communication mode does not support communication in non-contiguous segments of bandwidth. The method configures radio paths of the wireless communication chip to operate in the first communication mode or the second communication mode based on the determination. If the radio paths are configured to operate in the first communication mode, the method then communicates via the first communication mode with at least one remote device via two non-contiguous segments of bandwidth. Alternately, if the radio paths are configured to operate in the second communication mode, the method then communicates via the second communication mode with the at least one remote device via two contiguous segments of bandwidth.

In other aspects, a System-on-Chip (SoC) comprises a baseband processor, a first set of radio paths, and a first local oscillator operably coupled with the first set of radio paths. The SoC also includes a second set of radio paths and a second local oscillator operably coupled with the second set of radio paths. A communication configuration manager of the SoC is configured to determine, based on a hardware configuration external to the SoC, that the SoC is to operate in one of a first or second communication mode. The first communication mode supports communication in non-contiguous segments of bandwidth and the second communication mode does not support communication in non-contiguous segments of bandwidth. The configuration manager also configures, based on the determination, the first local oscillator or the second local oscillator to operate in accordance with the first communication mode or in accordance with the second communication mode.

In yet other aspects, an apparatus comprises multiple antennas, multiple amplifier paths, and a wireless communication chip. The wireless communication chip includes a first set of multiple radio paths, a second set of multiple radio paths, and a communication configuration manager configured to determine, based on a number of the multiple antennas or a number of the multiple amplifier paths, that the wireless communication chip is to operate in one of a first or second communication mode. The first communication mode supports communication in non-contiguous segments of bandwidth and the second communication mode does not support communication in non-contiguous segments of bandwidth. The configuration manager also configures, based on the determination, the first set of radio paths and the second set of radio paths of the wireless communication chip to operate in accordance with the first communication mode or in accordance with the second communication mode.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of a configurable wireless communication chip are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
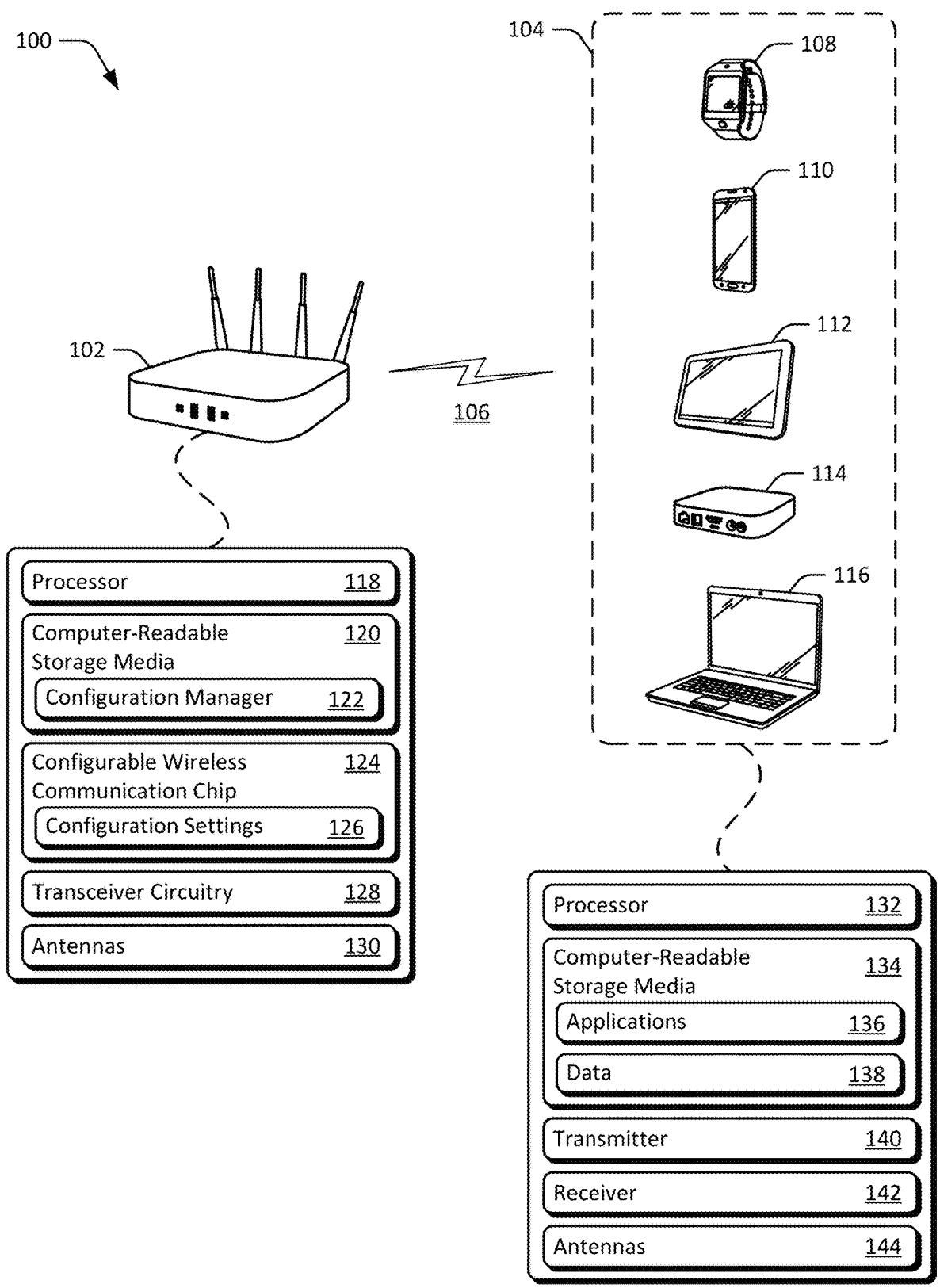
FIG. 1 illustrates an example operating environment that includes wireless devices in which a configurable communication chip can be implemented.

Conventional techniques for designing and manufacturing transceiver chips often result in a product line of several transceiver chips that are each configured for different hardware configurations. For example, a device manufacturer may build several different wireless routers that each feature a different hardware configuration, such as different numbers of antennas or costly amplification components due to cost or form factor considerations. To accommodate all these different hardware configurations, a transceiver chip provider typically designs and manufactures several transceiver chips, each with different internal hardware that corresponds to a respective one of the various device hardware configurations. In other cases, a transceiver chip provider may design and manufacture a few high-end transceiver chips that a device manufacturer is unable to fully utilize because they are unable to pair the high-end transceiver chips with a complete set of antenna or amplification components due to cost or space limitations. As such, conventional techniques for designing and manufacturing transceiver chips often produce transceiver chips that are limited to one hardware configuration or transceiver chips that are unsuitable for use in small or low-cost devices.

This disclosure describes apparatuses and techniques for a configurable wireless communication chip. Generally, these apparatuses and techniques may be employed to implement a configurable wireless communication chip in a variety of hardware platforms with different numbers of antennas and amplifier paths without compromising features of the hardware platform. For example, the configurable wireless communication chip can be implemented in a device with eight transmit paths and eight antennas to enable 8×8 MIMO communication in contiguous or non-contiguous 80 MHz segments of bandwidth, such as to communicate with a 160 MHz bandwidth-capable device. Alternately, the configurable wireless communication chip can be implemented in a device with four transmit paths and four antennas to enable 4×4 MIMO communication in contiguous 80 MHz segments of bandwidth, which still allows for communication with a 160 MHz bandwidth-capable device. As such, a configurable wireless communication chip can be implemented or embodied in different hardware platforms or devices without compromising wireless communication performance.

In some aspects, a configurable wireless communication chip includes multiple radio paths and is capable of operating in a first communication mode that supports communication in non-contiguous segments of bandwidth (e.g., 80 MHz+80 MHz) and a second communication mode that does not support communication in non-contiguous segments of bandwidth. Based on a hardware configuration external to the wireless communication chip (e.g., amplifiers or antenna), the radio paths can be configured to operate in the first communication mode or the second communication mode. When operating in the second communication mode, signals of the radio paths may be combined to enable the use of fewer amplifiers or antennas for communication across adjacent segments of bandwidth. In such cases, the configurable wireless communication chip can still implement advanced communication techniques with the reduced external hardware (e.g., 4×4 MIMO over 160 MHz channels), enabling flexibility to design lower cost or smaller devices.

The following discussion describes an operating environment, techniques that may be employed in the operating environment, and a System-on-Chip (SoC) in which components of the operating environment can be embodied. In the context of the present disclosure, reference is made to the operating environment by way of example only.

Operating Environment FIG. 1 illustrates an example operating environment 100 that includes an example host device 102 (e.g., access point) and example client devices 104 (e.g., stations) in accordance with one or more aspects. Each of these devices may be wireless-network-enabled and capable of communicating data, packets, and/or frames over a wireless link 106. The wireless link 106 may include any suitable type of wireless communication link, number of spatial streams, or wireless network connection. For example, the wireless link 106 may be implemented in whole or in part as a wireless local-area-network (WLAN), ad-hoc WLAN, wireless mesh network, near-field communication (NFC) link, wireless personal-area-network (WPAN), wireless wide-area-network (WWAN), or short-range wireless network. The wireless link 106 may be implemented in accordance with any suitable communication protocol, e.g., set in forth in a 3rd Generation Partnership Project (3GPP) specification or Institute of Electrical and Electronics Engineers (IEEE) standard, such as IEEE 802.11-2012, IEEE 802.11-2016, IEEE 802.11ac, IEEE 802.11ad, IEEE 802.11ax, IEEE 802.11ay, or the like.

In this example, the host device 102 is embodied as an access point that is capable of providing and managing a wireless network that includes respective wireless links 106 for communicating with the client devices 104. In other cases, the host device 102 may include or be embodied as a base station, enhanced node base station, wireless router, broadband router, modem device, drone controller, vehicle-based network device, home automation hub, or another network administration device. The client devices 104 of the example environment 100 include a smart-watch 108, smart-phone 110, tablet computer 112, set-top box 114, and laptop computer 116. Although not shown, other configurations of the client devices 104 are also contemplated, such as a medical device, printer, security system, home automation end-point, drone, camera, wearable smart-device, Internet-of-Things (IoT) device, portable gaming device, gaming console, personal media device, navigation device, mobile-internet device (MID), network-attached-storage (NAS) drive, mobile gaming console, and so on.

Generally, the host device 102 provides connectivity to the Internet, other networks, or network-resources through a backhaul link (not shown), which may be either wired or wireless (e.g., a T1 line, fiber optic link, broadband cable network, intranet, a wireless-wide-area network). The backhaul link may include or connect with data networks operated by an internet service provider, such as a digital subscriber line or broadband cable provider and may interface with the host device 102 via an appropriately configured modem (not shown). Generally, while associated with the host device 102 via the wireless link 106, the smartwatch 108, smart-phone 110, tablet computer 112, set-top box 114, or laptop computer 116 may access the Internet, resources of each other (e.g., shared network services), or other networks for which host device 102 acts as a gateway.

The host device 102 includes a processor 118 configured to execute processor-executable instructions and computer-readable storage media 120 (CRM 120). In some cases, the processor 118 is implemented as an application processor (e.g., multicore processor) to manage operation and connectivity of the host device 102. Alternately or additionally, the processor 118 can be implemented as a processor core, microprocessor, microcontroller, or digital signal processor (DSP). The CRM 120 of the host device 102 may include any suitable type and/or combination of storage media, such as read-only memory (ROM), random access memory (RAM), or Flash memory. In the context of the disclosure, the CRM 120 of the host device 102 is implemented as storage media, and thus does not include transitory signals or carrier waves. The CRM 120 may store firmware, an operating system (e.g., real-time operating system), or applications of the host device 102 as instructions that are executed by the processor 118 to implement various functionalities of the host device 102. In this example, a communication configuration manager 122 (configuration manager 122) of the host device 102 is also embodied on the CRM 120.

The configuration manager 122 of the host device 102 can be implemented to perform various functions associated with managing communication modes of a configurable wireless communication chip 124 of the client device 102. In some aspects, the configuration manager 122 accesses configuration settings 126 of the configurable wireless communication chip 124 to set the configurable wireless communication chip 124 to operate in a predefined communication mode. The configuration manager 122 may be stored as processor-executable instructions that, responsive to execution by the processor 120 or a processor of the configurable wireless communication chip 124 implement a configuration manager 122 to enable or manager wireless communication functionalities of the configurable wireless communication chip 124 or host device 102. The implementations and uses of a configuration manager 122 vary and are described throughout the disclosure.

The configurable wireless communication chip 124 is operably coupled with transceiver circuitry 128 and antennas 130 of the client device 102 and may provide wireless communication capabilities for the host device 102. For example, the configurable wireless communication chip 124 may be implemented or used to provide a wireless network, communicate wirelessly with one or more of the client devices 104, or to communicate other wirelessly-enabled devices. The configurable wireless communication chip 124 may include any suitable number of respective communication paths (e.g., transmit or receive chains) to support transmission or reception of multiple spatial streams of data, such as when implementing multiple-input multiple-output (MIMO) communication modes. Functionalities of the configurable wireless communication chip 124 can be managed or accessible through a communications controller (e.g., media access control layer) or baseband processor, which may be implemented with or separately from the configuration manager 122.

The configurable wireless communication chip 124 may include or represent any suitable combination of components to enable various communication operations, such as a precoder, symbol mapper/de-mapper, space-time coder/decoder, cyclic prefix module, channel estimator, interpolation filters, multiple-input multiple-output (MIMO) module, spatial stream processor, or the like. Alternately or additionally, the configurable wireless communication chip 124 can include a time domain processing block and/or a frequency domain processing block for processing orthogonal frequency-division multiplexed (OFDM) data packets and frames. The time domain processing block may include any suitable combination of hardware, processors, or software modules configured to implement time domain processing and associated functions, such as Fourier transforms and complex filtering. The frequency domain processing block may include any suitable combination of hardware, processors, or software modules configured to implement frequency domain processing and associated functions, such as phase and frequency-based calculations. The implementations and uses of a configurable wireless communication chip 124 vary and are described throughout the disclosure.

The transceiver circuitry 128 can be operably coupled between the configurable wireless communication chip 124 and the antennas 130 of the client device 102. Generally, the transceiver circuitry 128 includes radio frequency (RF) signal conditioning or processing components for amplifying, filtering, or converting signals transmitted or received by the configurable wireless communication chip 124. In some aspects, the transceiver circuitry 128 includes power amplifiers to amplify transmission signals of the configurable wireless communication chip 124 and low-noise amplifiers to amplify receive signals for the configurable wireless communication chip 124. Although not shown, the host device 102 may also include RF front-end circuitry to couple, connect, or route signals between the configurable wireless communication chip 124 and the antennas 130 to facilitate various types of wireless communication. The antennas 130 of the host device 102 may include an array of multiple antennas that are configured similar to or differently from each other (e.g., external and internal antennas).

Each of client devices 104 includes a processor 132 and computer-readable storage media 134 (CRM 134). The processor 132 can be any suitable type of processor, either single-core or multi-core, for executing instructions or code associated with applications, firmware, or an operating system of the client device 104. The CRM 134 may include any type and/or combination of suitable storage media, such as RAM, non-volatile RAM (NVRAM), ROM, or Flash memory useful to store data of applications and/or an operating system of the client device 104. In the context of the disclosure, the CRM 134 is implemented as storage media, and thus does not include transitory signals or carrier waves. In this example, applications 136 and data 138 of the client device 104 are embodied on the CRM 134, though a communication configuration manager 122 may also be embodied on the CRM 134 of the client device 104. In such cases, the configuration manager 122 of a client device 104 may be implemented similar to a configuration manager 122 of the host device 102.

Each of the client devices 104 also includes a transmitter 140, receiver 142, and antennas 144 for communicating with the host device 102 or other wirelessly-enabled devices. Although shown as separate entities, the transmitter 140 and receiver 142 may be implemented in combination as a transceiver component that supports both transmit and receive functionalities. The transmitter 140 or receiver 142 may include any suitable number of respective communication paths (e.g., transmit or receive chains) to support transmission or reception of multiple spatial streams of data. Functionalities of the transmitter 140 and/or receiver 142 may be managed or accessible through a communications controller or baseband processor, which may be implemented with or separately from the transmitter 140 and receiver 142. In some aspects, the transmitter 140 and receiver 142 may be implemented as a configurable wireless communication chip as described herein. Front-end circuitry (not shown) of the client device 104 may couple or connect the transmitter 140 or receiver 142 to the antennas 144 to facilitate various types of wireless communication. The antennas 144 may include an array of multiple antennas that are configured similar to or differently from each other.

Figure 2:
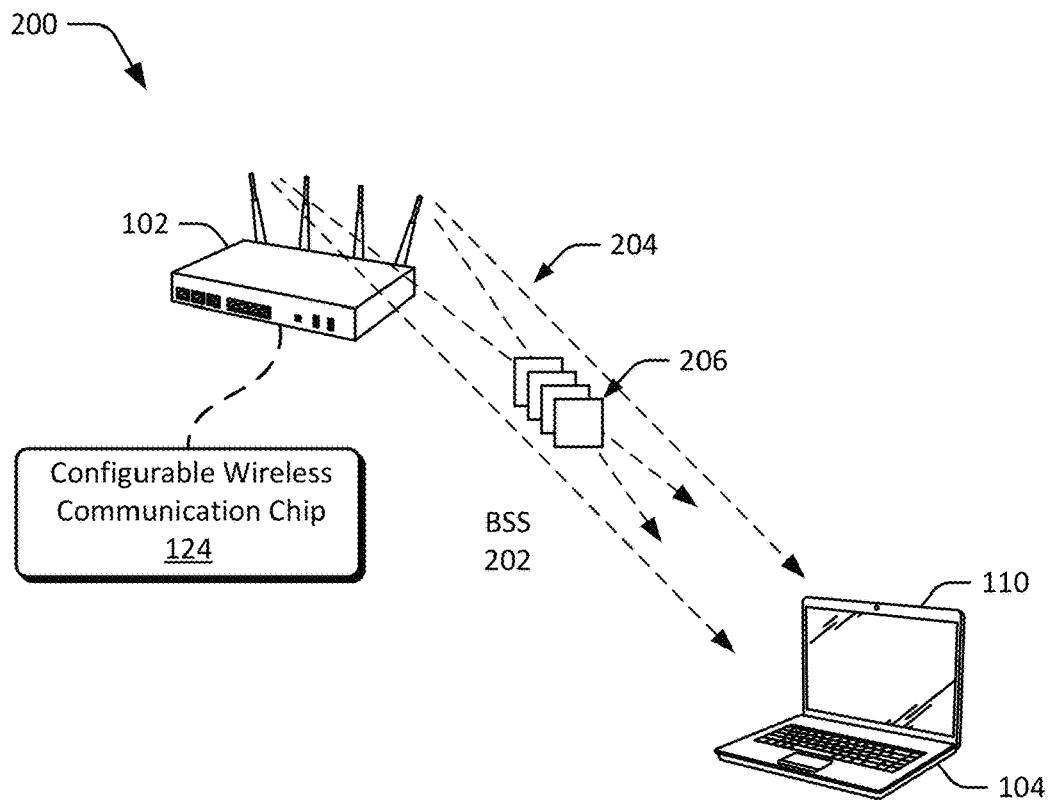
FIG. 2 illustrates an example wireless network in which devices of FIG. 1 may communicate using various segments of bandwidth of wireless spectrum.
Figure 2:
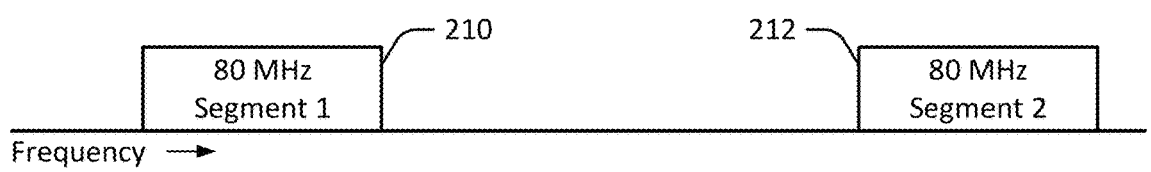
Figure 2:
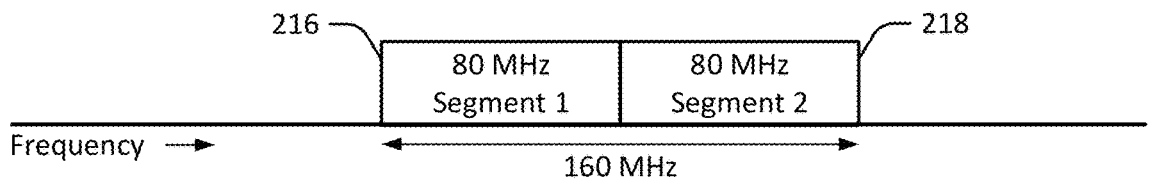

FIG. 2 illustrates an example wireless network 200 in which devices of the example environment 100 may communicate using various segments of bandwidth in accordance with one or more aspects. In the context of this example wireless network 200, a host device 102 (e.g., an access point) is configured to provide and manage a basic service set 202 (BSS 202) with which a client device 104 (e.g., laptop 110) is associated. The BSS 202 of the wireless network 200 may be provided or managed in accordance with any suitable wireless communication protocol or standard, such as IEEE 802.11ac, IEEE 802.11ad, IEEE 802.11ax, IEEE 802.11ay, IEEE 802.11-2016, or the like. Although shown as being implemented as an infrastructure type wireless fidelity (WiFi) network, the networking environment 200 may also be implemented with one or more of a peer-to-peer network, mesh network, personal area network, or cellular network.

In some aspects, the host device 102 and client devices 104 of the wireless network 200 are configured to implemented multiple-input multiple-output (MIMO) communications. As shown in FIG. 2, the host device 102 can transmit multiple spatial streams 204 by which frames 206 are encoded and transmitted to the laptop 110. Here, the packets 210 are may be referred to as intended packets, which are intended for reception by the laptop 110. Although illustrated with four spatial streams 204, MIMO communication between a host device 102 and client device 104 may include any suitable number of spatial streams, such as two, four, eight, and so on.

With reference to a physical (PHY) layer of the 802.11 standard, configurable wireless communication chip 124 the client device 102 may implement a Physical Layer Convergence Procedure (PLCP) sublayer for communicating frames or packets. The PLCP sublayer may prepare a frame for transmission by taking the frame from the media access control (MAC) sublayer and creating a PLCP Protocol Data Unit (PPDU) packet. A physical medium dependent (PMD) sublayer of the PHY then modulates and transmits the packet data as bits. Accordingly, any data, packet, or frame described herein may include a protocol data unit (PDU), MAC PDU (MPDU), PLCP service data unit (PSDU), PLCP PDU (PPDU), or the like.

The spatial streams 206 can be communicated via any suitable wireless channel, frequency band, segment of frequency bandwidth, portion of frequency bandwidth, or the like. For example, the IEEE 802.11ac and the IEEE 802.11ax standards define a variety of channels in a 5 GHz frequency band that include bandwidths of 20 MHz, 40 MHz, 80 MHz, or 160 MHz. In some cases, a 160 MHz bandwidth includes one portion of 160 MHz bandwidth or two portions of 80 MHz bandwidth, or an 80 MHz+80 MHz bandwidth configuration. In such cases, an 80 MHz+80 MHz bandwidth configuration can be implemented as non-adjacent or non-contiguous segments of bandwidth or adjacent or contiguous bandwidth segments.

By way of example, consider a non-contiguous 80 MHz+80 MHz mode 208 in which a first 80 MHz segment of bandwidth 210 not contiguous with or adjacent to a second 80 MHz segment of bandwidth 212. Generally, MIMO communications over non-contiguous segments of bandwidth may implement two local oscillators to operate one set of radio paths with a first local oscillator at a first frequency (e.g., for segment 1) and another set of radio paths with a second local oscillator at a second frequency (e.g., for segment 2). In the case of 8×8 MIMO communication across the non-contiguous segments of bandwidth 210 and 212, the configurable wireless communication chip 124 would use eight transmit paths and eight receive paths thereby supporting up to eight spatial streams.

With respect to a contiguous 80 MHz+80 MHz mode 214, a first 80 MHz segment of bandwidth 216 is contiguous with or adjacent to a second 80 MHz segment of bandwidth 218. Generally, a communication waveform of contiguous 80 MHz+80 MHz segments may be similar or same as a waveform for communicating over a 160 MHz bandwidth segment. In other words, a device capable or configured to communicate via contiguous 80 MHz+80 MHz segments may communicate with another device capable or configured to communicate via a 160 MHz bandwidth segment. Generally, MIMO communications made over contiguous segments of bandwidth may implement one oscillator or a shared local oscillator to operate two sets of radio paths based on a common or shared local oscillator output (or that of a frequency synthesizer). In the case of 4×4 MIMO communication across the contiguous segments of bandwidth 216 and 218, the configurable wireless communication chip 124 would use eight transmit paths and eight receive paths that are combined thereby supporting up to four spatial streams across 160 MHz.

Figure 3:
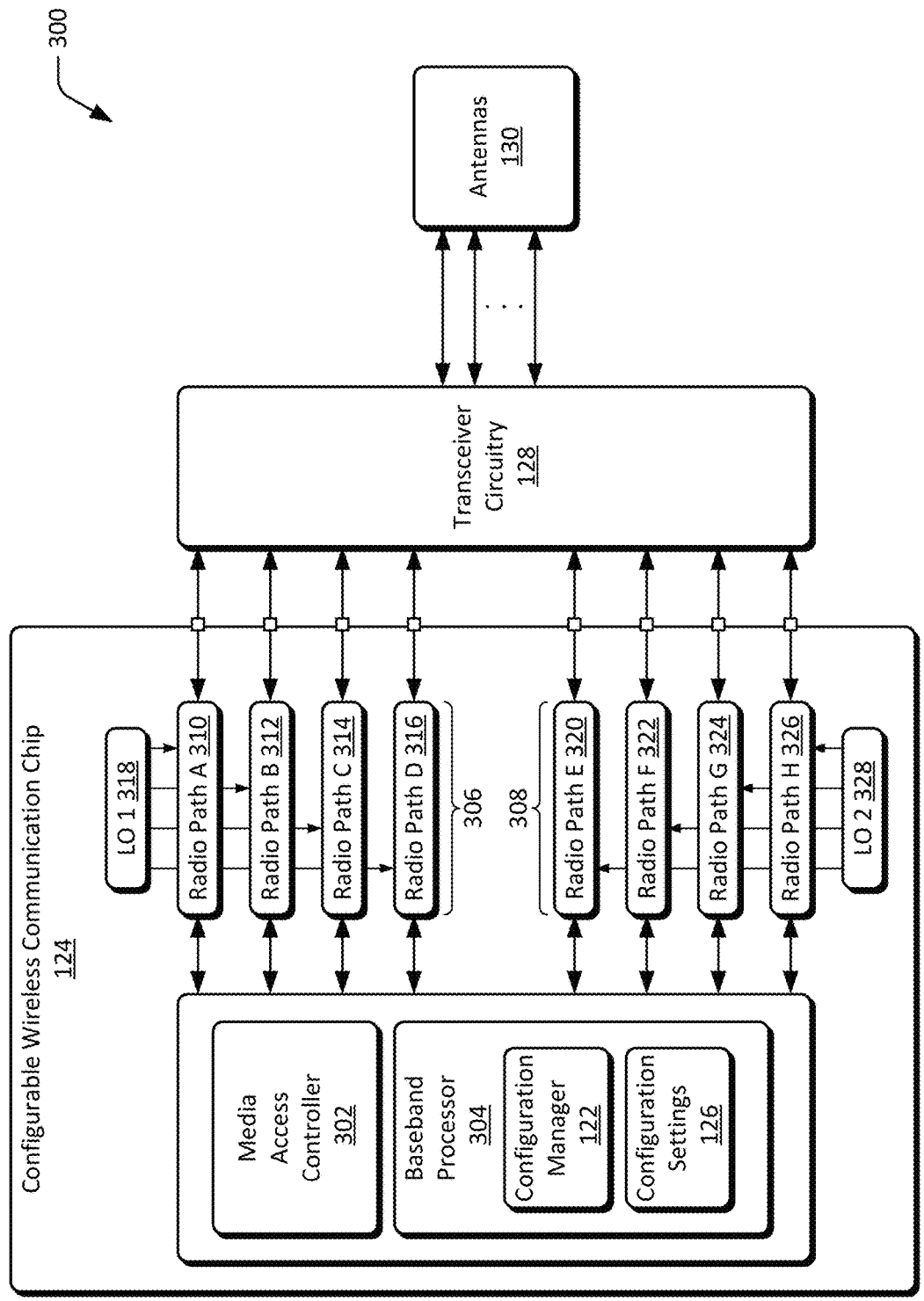
FIG. 3 illustrates an example of a configurable wireless communication chip implemented in accordance with one or more aspects.

FIG. 3 illustrates an example of a configurable wireless communication chip 124 implemented in accordance with one or more aspects generally at 300. In various aspects or implementations, a configurable wireless communication chip 124 includes components to enable at least two communication modes. These communication modes may include a first communication mode that supports communication over both contiguous and non-contiguous segments of bandwidth (or wireless spectrum), and a second communication mode that supports communication over contiguous segments of bandwidth (or wireless spectrum). In other words, when configured for the second communication mode, the configurable wireless communication chip 124 may be implemented or operate in a device that features a reduced number of transceiver components, a reduced number of antennas, or does not support communication across non-contiguous segments of bandwidth.

In some aspects, the configurable wireless communication chip 124 includes a media access controller 302 and a baseband processor 304. The media access controller 302 may be integrated with the baseband processor 304 and provide or manage data link layer functionalities of the configurable wireless communication chip 124. The baseband processor 304 may include a processor core, digital signal processor, or other circuitry to perform baseband processing of data for transmission as signals or received signals from which data is obtained. For example, the baseband processor 304 may implement or include processing blocks for one or more of constellation mapping/demapping, frequency domain processing, FFT/IFFT, time domain processing, digital-to-analog conversion, analog-to-digital conversion, channel estimation, frequency and/or timing synchronization, or the like.

The baseband processor 304 may also include a communication configuration manager 122 (configuration manager 122) and configuration settings 126, which may be stored as instructions, data, or firmware of the baseband processor 304. In some aspects, the configuration manager 122 determines, sets, and/or modifies the configuration settings 126 effective to configure an architecture or components of the configurable wireless communication chip 124. The configuration settings 126 can be implemented as one or more registers that define, specify, or enable selection of communication modes or architecture configurations (e.g., local oscillator settings) of the configurable wireless communication chip 124. For example, the configuration manager 124 can access the configuration settings 126 to determine which communication mode the configurable wireless communication chip 124 is to operate in and configure components of the configurable wireless communication chip 124 to operate in the determined communication mode. As noted, the communication modes of the configurable wireless communication chip 124 may include a first communication mode that supports communication in both contiguous and non-contiguous segments of bandwidth, and a second communication mode that supports communication in contiguous segments of bandwidth.

Figure 4:
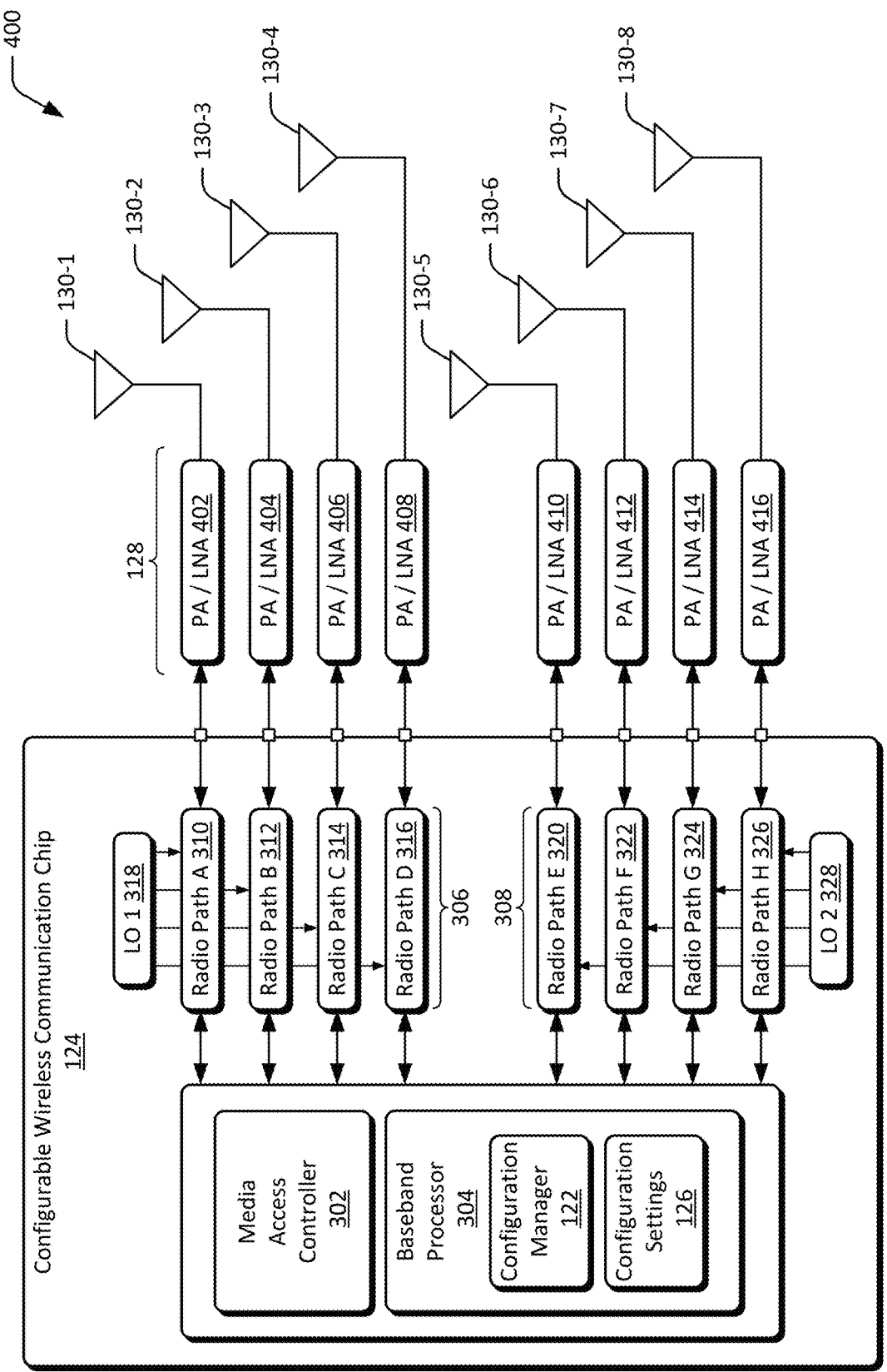
FIG. 4 illustrates an example of the configurable wireless chip of FIG. 3 that is implemented to operate in a first communication mode.

The configurable wireless communication chip 124 also includes multiple radio paths of components for processing or conditioning signals communicated by the configurable wireless communication chip. In this example, the multiple radio paths of the configurable wireless communication chip 124 are illustrated as a first set of four radio paths 306 and a second set of four radio paths 308. The first set of radio paths 306 includes radio paths 310 through 316 that are operably coupled with a first local oscillator 318 and the second set of radio paths 308 includes radio paths 320 through 326 that are operably coupled with a second local oscillator 328. As shown in FIG. 4, the radio paths may also be referred to by a reference letter, such that (i) the first set of radio paths 306 includes radio paths A through D, and (ii) the second set of radio paths 308 includes radio paths E through H.

Generally, the first and second set of radio paths 306 and 308 are coupled between the baseband processor 304 of the configurable wireless communication chip 124 and the transceiver circuitry 128, which can be implemented as components external to the configurable wireless communication chip 124. Each of the radio paths 310 through 316 and/or 320 through 326 may support communication (e.g., Tx/Rx) of one spatial stream of information. As such, the configurable wireless communication chip 124 may be configured to operate in various 2×2, 4×4, or 8×8 modes of MIMO communication in which the spatial streams of the radio paths are amplified by the transceiver circuitry 128 prior to transmission or after reception through the antennas 130. As described herein, a host device 102 or client device 104 in which the configurable wireless communication chip 124 is embodied may be implemented with eight antennas 130 in some aspects or fewer than eight antennas 130 in other aspects.

FIG. 4 illustrates at 400 an example of the configurable wireless communication chip and transceiver circuitry that is implemented to operate in a first communication mode. Generally, the configurable wireless communication chip 124 can be implemented with a configurable architecture of N transmit (Tx) and N receive (Rx) ($N_{TX} \times N_{RX}$ design) radio paths that are configurable to operate in the at least two communication modes. With reference to FIG. 4, a first communication mode of the configurable wireless communication chip 124 is shown in which each of N paths of transceiver circuitry 128 (e.g., eight paths of external components) are coupled between each of the N Tx/Rx radio paths (e.g., eight radio paths) of the configurable wireless communication chip 124 and each of the N antennas 130 (e.g., eight antennas). This may also be referred to as an 80 MHz+80 MHz mode or non-contiguous communication mode in which each of the eight radio paths 306, 308 is coupled to a dedicated or respective one of the eight transceiver paths and one of the eight antennas 130.

In this example, the transceiver circuitry 128 includes eight transceiver paths 402 through 416 that each include a power amplifier (PA) and a low-noise amplifier (LNA). The power amplifier or PA of each transceiver circuit path may amplify signals to provide amplified signals for transmission by a respective one of the antennas 130. Alternately or additionally, the low-noise amplifier or LNA of each receiver path may amplify low-power signals received by a respective one of the antennas 130 to provide amplified signals for subsequent filtering, conditioning, or demodulation. Although described as including amplifier components, the transceiver paths 402 through 416 may include other external signal conditioning components, such as variable gain amplifiers, filters, switches, or the like.

With respect to communication in non-contiguous segments of bandwidth, the illustrated architecture configuration or the first communication mode of the configurable wireless communication chip 124 may enable communication in either contiguous or non-contiguous segments of bandwidth. For example, the first local oscillator 318 by which the first set of radio paths 310 through 316 (A-D) operate and the second local oscillator 328 by which the second set of radio paths 320 through 326 (E-H) operate may be set by the configuration manager 122 to any 80 MHz segment, channel, or band of wireless spectrum. Thus, in the first communication mode, the configurable wireless communication chip 124 may implement up to eight spatial streams of MIMO communication (e.g., 8×8 MIMO) across any contiguous or non-contiguous 80 MHz segments of frequency. For example, the configurable wireless communication chip 124 may use the first set of radio paths 310 through 316 (A-D) to implement four spatial streams in one 80 MHz segment that is not contiguous with another 80 MHz segment in which the second set of radio paths 320 through 326 are used to implement another four spatial streams.

Figure 5:
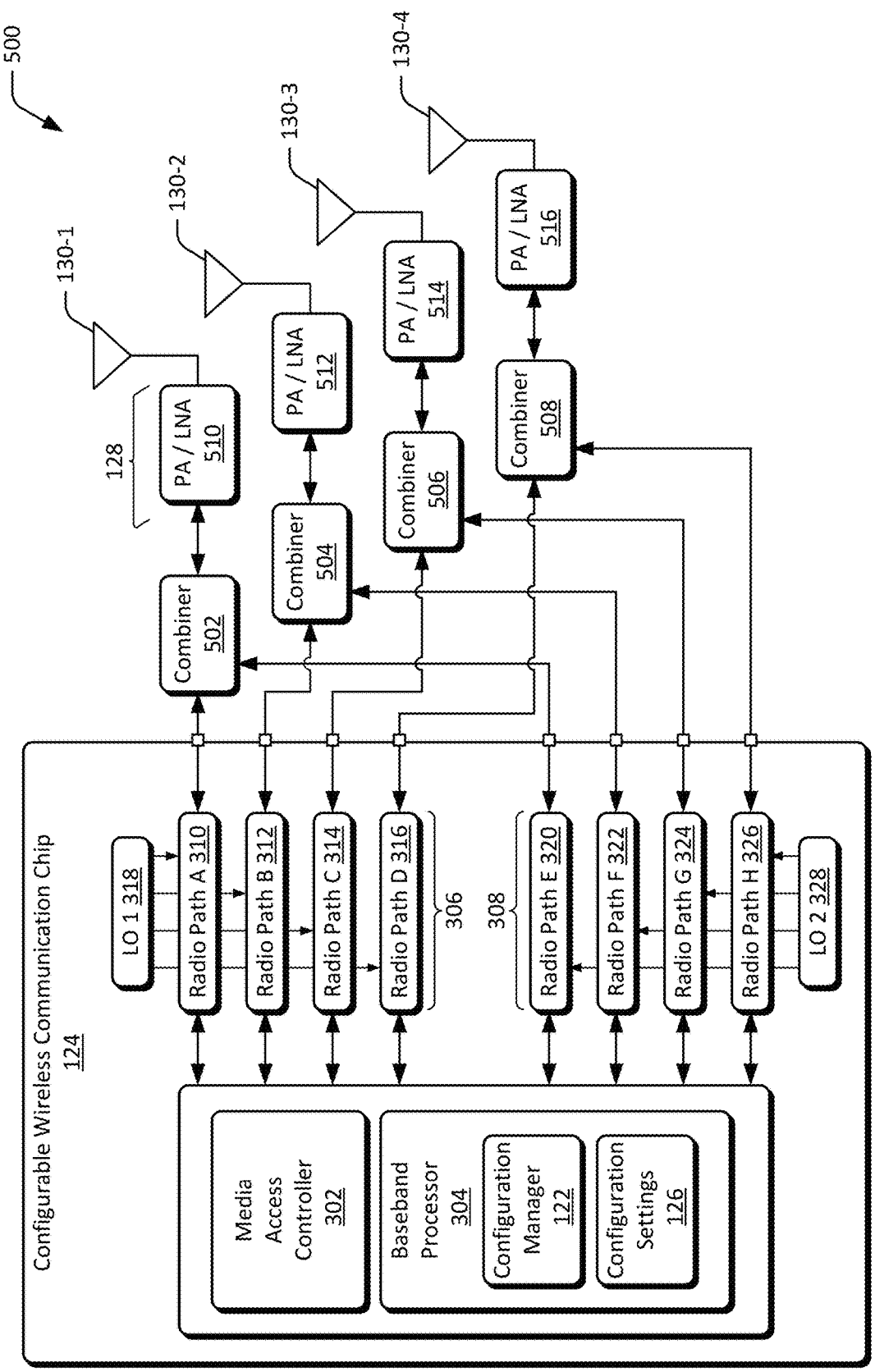
FIG. 5 illustrates another example of the configurable wireless chip of FIG. 3 that is implemented to operate in a second communication mode.

FIG. 5 illustrates at 500 an example of the configurable wireless communication chip and transceiver circuitry that is implemented to operate in a second communication mode. As described, the configurable wireless communication chip 124 can be implemented with an architecture of N transmit and N receive ($N_{TX} \times N_{RX}$ design) radio paths (e.g., radio paths A-H) that are configurable to operate in the at least two communication modes. Here, note that as shown in FIG. 5 the second communication mode can be implemented with fewer than N transceiver paths of external components (e.g., external to the configurable wireless communication chip 124) or with fewer than N antennas. In some cases, this can be effective to enable the configurable wireless communication chip 124 to be embodied or used in wireless devices that have lower design costs (e.g., fewer expensive amplifier components) or smaller form-factors (e.g., fewer antennas or external RF ports). This may also be referred to as a 160 MHz reduced antenna communication mode in which the local oscillators of the configurable wireless communication chip 124 are set to adjacent 80 MHz segments of bandwidth. In some cases, this second communication mode uses N/2 external PA/LNA/antennas with pairs of the Tx/Rx paths for two respective 80 MHz segments that are combined for one 160 MHz segment before the PA/LNA connection.

By way of example, consider the architecture configuration shown at 500 in which the configurable wireless communication chip 124 includes N radio paths that are coupled to N/2 paths of transceiver circuitry 128 (e.g., external components) and N/2 antennas via respective combiner components. In the context of FIG. 5, pairs of radio paths from each of the first set of radio paths 306 and second set of radio paths 308 (e.g., A-E, B-F, C-G, and D-H) are coupled to a respective one of a set of four combiners 502 through 508. By combining one or more pairs of the radio paths, the second communication mode or architecture can be implemented with four paths of transceiver circuitry 128 and four antennas 128. In this example, the combiners 502 through 508 are coupled to a respective one of the antennas 130-1 through 130-4 via one of the transceiver paths 510 through 516.

The transceiver paths 510 through 516 each include a power amplifier (PA) and a low-noise amplifier (LNA). The power amplifier or PA of each transceiver circuit path may amplify signals to provide amplified signals for transmission by a respective one of the antennas 130. Alternately or additionally, the low-noise amplifier or LNA of each receiver path may amplify low-power signals received by a respective one of the antennas 130 to provide amplified signals for subsequent filtering, conditioning, or demodulation. Although described as including amplifier components, the transceiver paths 502 through 508 may include other external signal conditioning components, such as variable gain amplifiers, filters, switches, or the like.

With respect to communication in contiguous segments of bandwidth, the illustrated architecture configuration or the second communication mode of the configurable wireless communication chip 124 may enable communication in contiguous 80 MHz segments of bandwidth, such as to communicate with a device over 160 MHz of bandwidth. For example, pairs of the radio paths 306 and 308 can be combined as A-E, B-F, C-G, and D-H prior to a connection with an external amplification path, such as the PA/LNA transceiver paths 510 through 516. The first local oscillator 318 and the second local oscillator 326 can be configured or set by the configuration manager 122 to operate in adjacent bands effective to enable communication over the 160 MHz segment via the combined transmit and receive paths with fewer antennas.

Although implemented with eight radio paths, this may enable the configurable wireless communication chip 124 to communicate via 4×4 MIMO at 160 MHz to achieve data rates similar to an 8×8 MIMO in non-contiguous 80 MHz segments. Thus, the configurable wireless communication chip 124 may be implemented with fewer external transceiver components and antennas without losing the capability to communicate with a 160 MHz-enabled device or at similar data rates. Alternately or additionally, the configurable wireless communication chip 124 may still communicate in the second communication mode using up to four spatial streams, such as in a 4×4 MIMO scheme, over smaller bandwidth segments of 20 MHz, 40 MHz, or 80 MHz.

Figure 6:
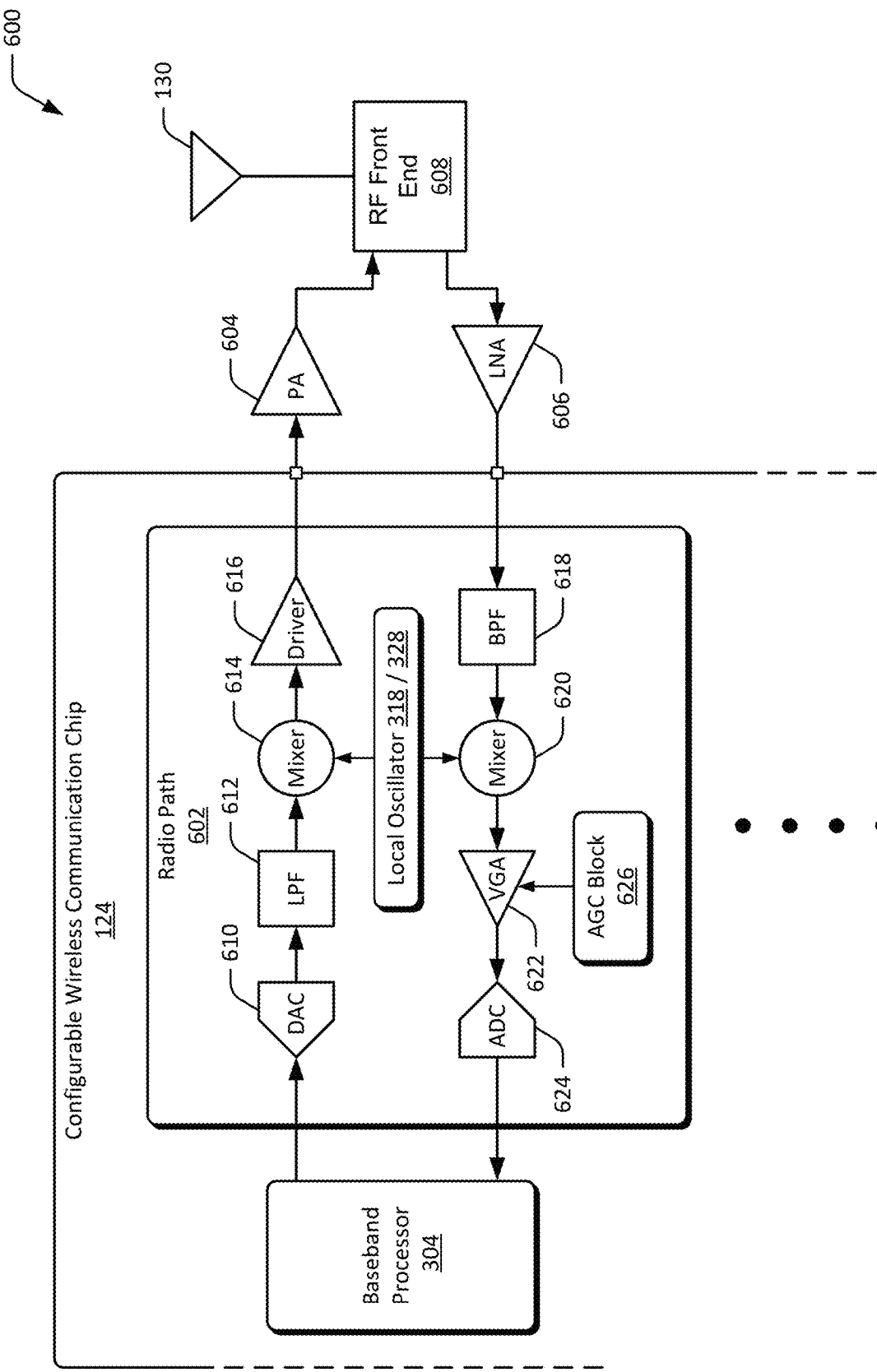
FIG. 6 illustrates an example configuration of a radio path and transceiver components in accordance with one or more aspects.

FIG. 6 illustrates an example configuration of a radio path and transceiver components in accordance with one or more aspects generally at 600. The radio path 602 of FIG. 6 may be representative of any or all of the radio paths 310 through 316 and/or the radio paths 320 through 326. Alternately, a radio path of the configurable wireless communication chip 124 can be implemented with different signal processing or signal conditioning blocks, which may be arranged in any suitable configuration or order to implement respective transmit and receive chains of the chip. Other examples of radio path or baseband components are described throughout this disclosure and may be used with or in place of the components described with reference to FIG. 6.

In this example, the radio path 602 is coupled between a baseband process 304 and transceiver components that include a power amplifier 604 and a low-noise amplifier 606. The transceiver components may be implemented external to the configurable wireless communication chip 124, such as on a printed circuit board (PCB) or substrate of a device in which the configurable wireless communication chip 124 is embodied. An RF front end 608 of a device or radio module provides connectivity between an antenna 130 and both of the power amplifier 604 and the low-nose amplifier 606. The RF front end 608 may be implemented with any suitable switching or signal conditioning components, such as single-pole double-throw switches, diplexers, duplexers, filters, baluns, or the like.

Generally, the radio path 602 includes respective components to implement a transmit path or transmit chain for transmitting signals and a receive path or receive chain for receiving signals. Although shown combined, the transmit path and receive path of the radio path 602 or other radio paths may be implemented separately. In this example, the transmit path includes a digital-to-analog converter 610 to convert encoded data received from the baseband processor 304 to analog baseband signals, which are then filtered via a low-pass filter 612. A mixer 614 mixes the baseband signals based on a signal provided by one of the local oscillators 318, 328 of the configurable wireless communication chip 124 to upconvert the baseband signals to RF signals. The RF signals are then pre-amplified by a driver 616 of the radio path 602 before being sent to the power amplifier 604. The power amplifier 604 amplifies the signals for transmission, and the RF front end 608 routes the amplified signals to the antenna 130 for transmission to a receiving wireless device.

The receive path of the example radio path 602 includes a band-pass filter 628 that receives amplified signals from the low-noise amplifier 606. These signals may be received via the antenna from a transmitting device and routed through the RF front end 608 to the low-noise amplifier 606. The bandpass filter 618 provides filtered RF signals to another mixer 602 that down converts the RF signals to baseband signals based on a signal provided by one of the local oscillators 318, 328 of the configurable wireless communication chip 124. A variable-gain amplifier 622 amplifies the baseband signals (or received RF/IF signals in other implementations) and provides the amplified receive signals to an analog-to-digital converter 624 for conversion into digital format, which is then processed by the baseband processor 304 for demodulation or decoding of receive data.

In this example, the radio path 602 also includes an automatic-gain control block 626 (AGC block 626) to adjust or alter gain settings of the variable-gain amplifier 622 of the receive path. In some aspects, the AGC block 626 or respective AGC blocks of the radio paths 310 through 316 and/or the radio paths 320 through 326 are configured based on a communication mode in which the configurable wireless communication chip 124 operates or implements. For example, when operating in the first communication mode in which the radio paths are operated independently for communication over contiguous or non-contiguous segments of bandwidth, the AGC blocks may be operated separately for radio paths communicating over non-contiguous segments of bandwidth (e.g., non-adjacent 80 MHz segments). Alternately, when operating in the second communication mode in which pairs of the radio paths (e.g., A-E, B-F, C-G, or D-H) are configured to communicate in contiguous or adjacent segments of bandwidth, the AGC blocks may be operated commonly or a common AGC block may be used to adjust gain of respective variable-gain amplifiers of both radio paths that are configured to communicate over the adjacent 80 MHz segments (at 160 MHz).

Techniques of a Configurable Wireless Communication Chip The following discussion describes techniques of a configurable wireless communication chip. These techniques can be implemented using any of the environments and entities described herein, such as a communication configuration manager 122 (configuration manager 122) and/or configuration settings 126 of a host device. Alternately or additionally, the techniques can be implemented by or in combination with a configuration manager 122 and/or configuration settings 126 embodied on a client device or another wireless platform. These techniques include methods that are illustrated in FIGS. 7 and 8, each of which is shown as a set of operations performed by one or more entities.

The illustrated methods are not necessarily limited to the orders or combinations of operations shown in the Figures. Rather, any of the operations may be repeated, omitted, substituted, or re-ordered to implement various aspects described herein. Further, these methods may be used in conjunction with one another, in whole or in part, whether performed by the same entity, separate entities, or any combination of the entities. In portions of the following discussion, reference may be made to the operating environment 100 of FIG. 1, the wireless network of FIG. 2, and/or respective chip and circuitry configurations of FIG. 3, FIG. 4, FIG. 5, or FIG. 6 by way of example. Such reference is not intended to be limiting any of the described aspects to the operating environment 100, wireless network 200, or respective component configurations but rather as illustrative of one of a variety of examples.

Figure 7:
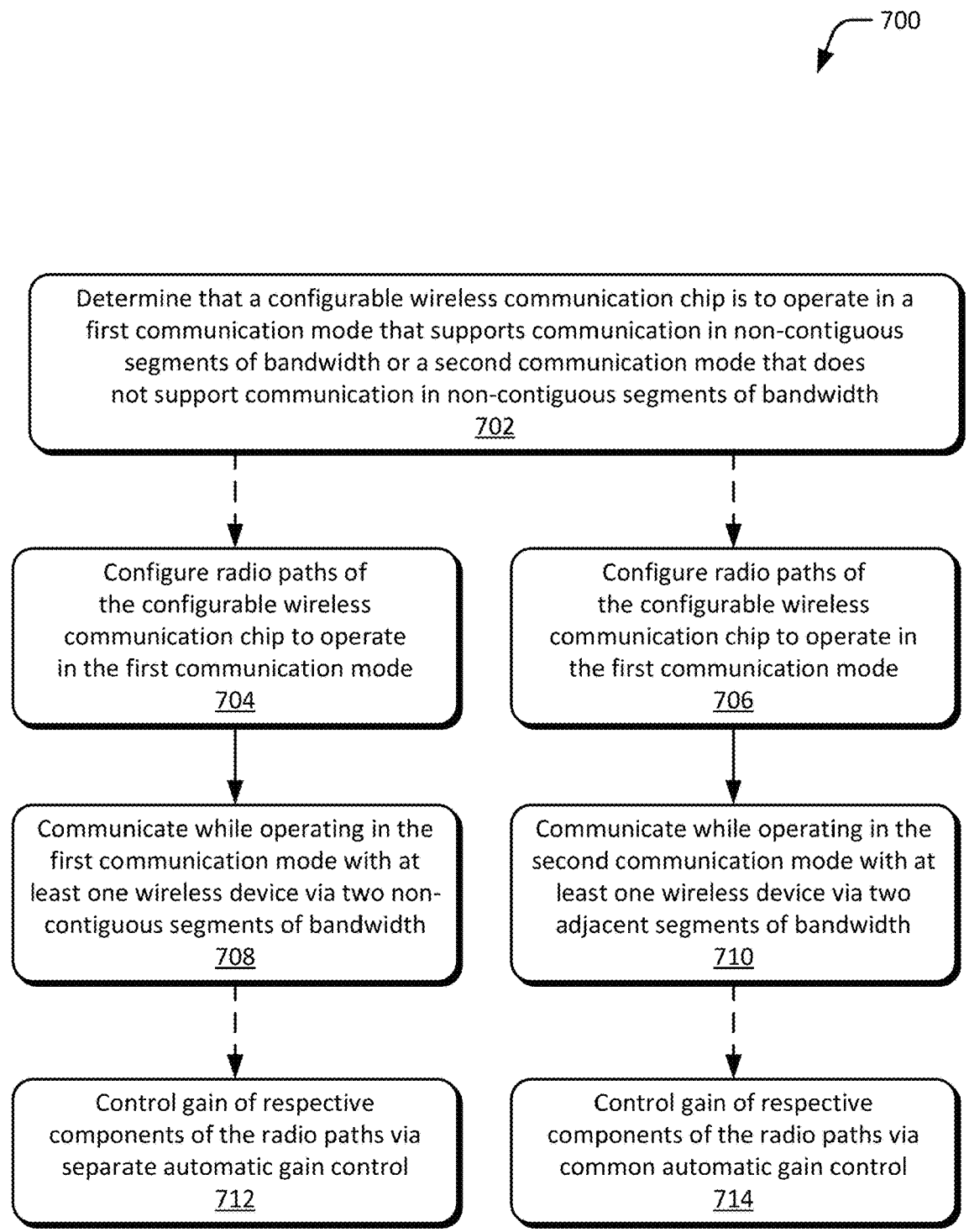
FIG. 7 depicts an example method for configuring a configurable wireless communication chip to operate in a first communication mode or a second communication mode.
Figure 8:
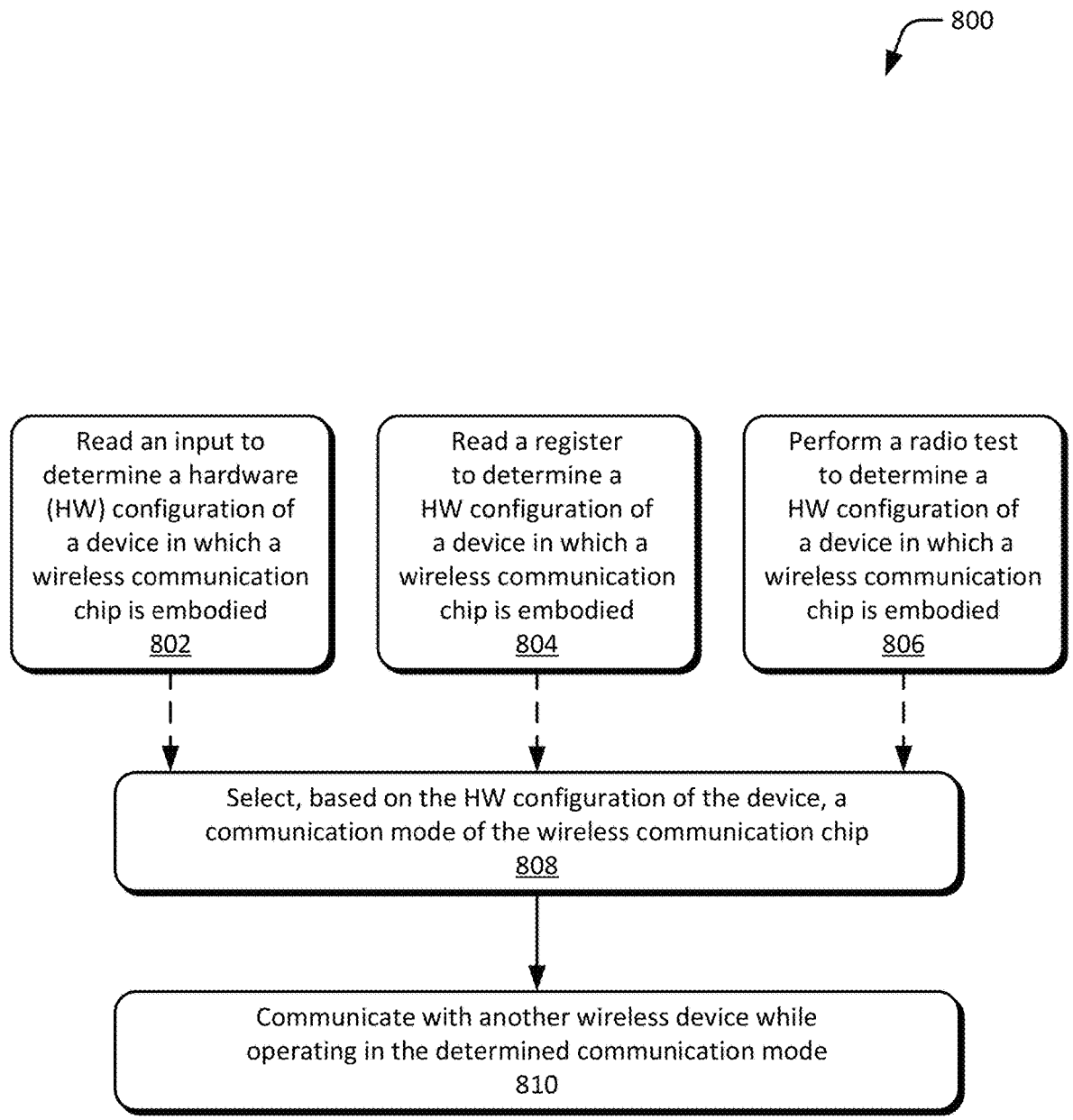
FIG. 8 depicts an example method for setting a communication mode of a configurable wireless communication chip based on a hardware configuration of a device.

FIG. 7 depicts an example method 700 for configuring a configurable wireless communication chip to operate in a first communication mode or a second communication mode, including operations performed by the configuration manager 122.

At 702, a determination is made that a configurable wireless communication chip is to operate in a first communication mode or a second communication mode. In some cases, the determination is based on a hardware configuration of a device in which the configurable wireless communication chip is embodied in or will be embodied in. The hardware configuration may include amplifier paths, components, or antennas that are external to the configurable wireless communication chip. For example, the external configuration may include a number of amplifier paths or a number of antennas of a hardware platform or device. The first communication mode may support communication in non-contiguous segments of bandwidth of wireless spectrum and the second communication mode may not support communication in non-contiguous segments of the wireless spectrum. In other words, the second communication mode supports communication in adjacent segments of bandwidth.

Optionally at 704, radio paths of the configurable wireless communication chip are configured to operate in the first communication mode. The radio paths may be configured for the first communication mode responsive to determining that the configurable wireless communication chip is to operate in the first communication mode. Configuring the radio paths of the configurable wireless communication chip for the first communication mode may include setting local oscillators associated with the radio paths for operation in any segment of bandwidth, such as non-contiguous segments. Alternately or additionally, gain control for respective variable-gain amplifiers of the radio paths may be configured for separate of each variable-gain amplifier. From operation 704, the method 700 may proceed to operation 708.

Optionally at 706, radio paths of the configurable wireless communication chip are configured to operate in the second communication mode. The radio paths may be configured for the second communication mode responsive to determining that the configurable wireless communication chip is to operate in the second communication mode. Configuring the radio paths of the configurable wireless communication chip for the second communication mode may include setting local oscillators associated with the radio paths for operation in adjacent segments of bandwidth, such as contiguous segments. In some cases, this enables two radio paths to share a single amplification path and antenna for communication. Alternately or additionally, gain control for respective variable-gain amplifiers of at least two radio paths may be configured with common gain control (e.g., based of a single RF peak detection or RF power measurement) for the at least two variable-gain amplifiers. From operation 706, the method 700 may proceed to operation 710.

At 708, the configurable wireless communication chip communicates with at least one wireless device while operating in the first communication mode. In accordance with the first communication mode, the configurable wireless communication chip communicates with the wireless device via two non-contiguous segments of bandwidth. For example, the configurable wireless communication chip may communicate via multiple spatial streams at 80 MHz of bandwidth, such as through a non-contiguous 80 MHz+80 MHz 8×8 MIMO communication scheme.

At 710, the configurable wireless communication chip communicates with at least one wireless device while operating in the second communication mode. In accordance with the second communication mode, the configurable wireless communication chip communicates with the wireless device via two adjacent segments of bandwidth. For example, the configurable wireless communication chip may communicate via multiple spatial streams at 80 MHz of bandwidth, such as through a contiguous 80 MHz+80 MHz 4×4 MIMO communication scheme to communicate with a 160 MHz bandwidth-capable device.

Optionally at 712 and from operation 708, gain of respective components of the radio paths of the configurable wireless communication chip are controlled via separate automatic gain control. As described herein, when communicating via multiple radio paths with separate or dedicated amplifiers and antennas, the configurable wireless communication chip may implement separate gain control for variable-gain amplifiers of each radio path.

Optionally at 714 and from operation 710, gain of respective components of the radio paths of the configurable wireless communication chip are controlled via common automatic gain control. For example, with receive signals for two radio paths are received via a same antenna or amplified by a same amplification path, the configurable wireless communication chip may implement shared or common gain control to manage amplification provided by respective variable gain amplifiers in each radio path.

FIG. 8 depicts an example method 800 for setting a communication mode of a configurable wireless communication chip based on a hardware configuration of a device, including operations performed by the configuration manager 122.

At 802, an input is read to determine a hardware configuration of a device in which the configurable wireless communication chip is embodied. In some cases, an input or general-purpose input/output (GPIO) of the configurable wireless communication chip is pulled to a high or low reference voltage of a circuit board or radio module in which the configurable wireless communication chip is embodied. In such cases, a voltage or state of the input can reflect or indicate a hardware configuration of a device or radio module in which the configurable wireless communication chip is embodied. For example, the configuration manager 122 may read one or more inputs of the configurable wireless communication chip to determine if four or eight amplification paths and antennas are or will be coupled to the configurable wireless communication chip.

At 804, a register is read to determine a hardware configuration of a device in which the configurable wireless communication chip is embodied. The register may be a register of the baseband processor or a memory of the configurable wireless communication chip. In some cases, the register is programmed as part of a firmware image of the configurable wireless communication chip. For example, the configurable wireless communication chip may be flashed for use in a particular hardware platform with a known number of antennas or amplifier paths that will be coupled to the configurable wireless communication chip. In other words, bits of the register or other information of the configurable wireless communication chip's firmware may indicate a configuration of components external to the configurable wireless communication chip.

At 806, a radio test is performed to determine a hardware configuration of a device in which the configurable wireless communication chip is embodied. In yet other cases, the configurable wireless communication chip may perform an RF-based test to determine if an antenna is coupled to each radio path or if pairs of the radio paths are coupled by a combiner for a reduced-antenna implementation. By so doing, a hardware configuration of a device can be detected without custom firmware settings or dedicated pull-up resistors or pull-down resistors on a printed circuit board or radio module.

At 808, a communication mode of the configurable wireless communication chip is selected based on the hardware configuration of the device in which the configurable wireless communication chip is embodied. The communication mode may be selected from a first communication mode that supports communication in non-contiguous segments of bandwidth and a second communication mode that does not support communication in non-contiguous segments of bandwidth. In other words, the second communication mode supports communication in adjacent segments of bandwidth.

At 810, communication with another wireless device is performed while the configurable wireless communication chip operates in the determined communication mode. In accordance with the selected communication mode, the configurable wireless communication chip may communicate with the other wireless device via non-contiguous segments of bandwidth (e.g., 80 MHz+80 MHz channels) or contiguous segments of bandwidth (e.g., adjacent 80 MHz+ MHz or 160 MHz channels).

System-on-Chip

Figure 9:
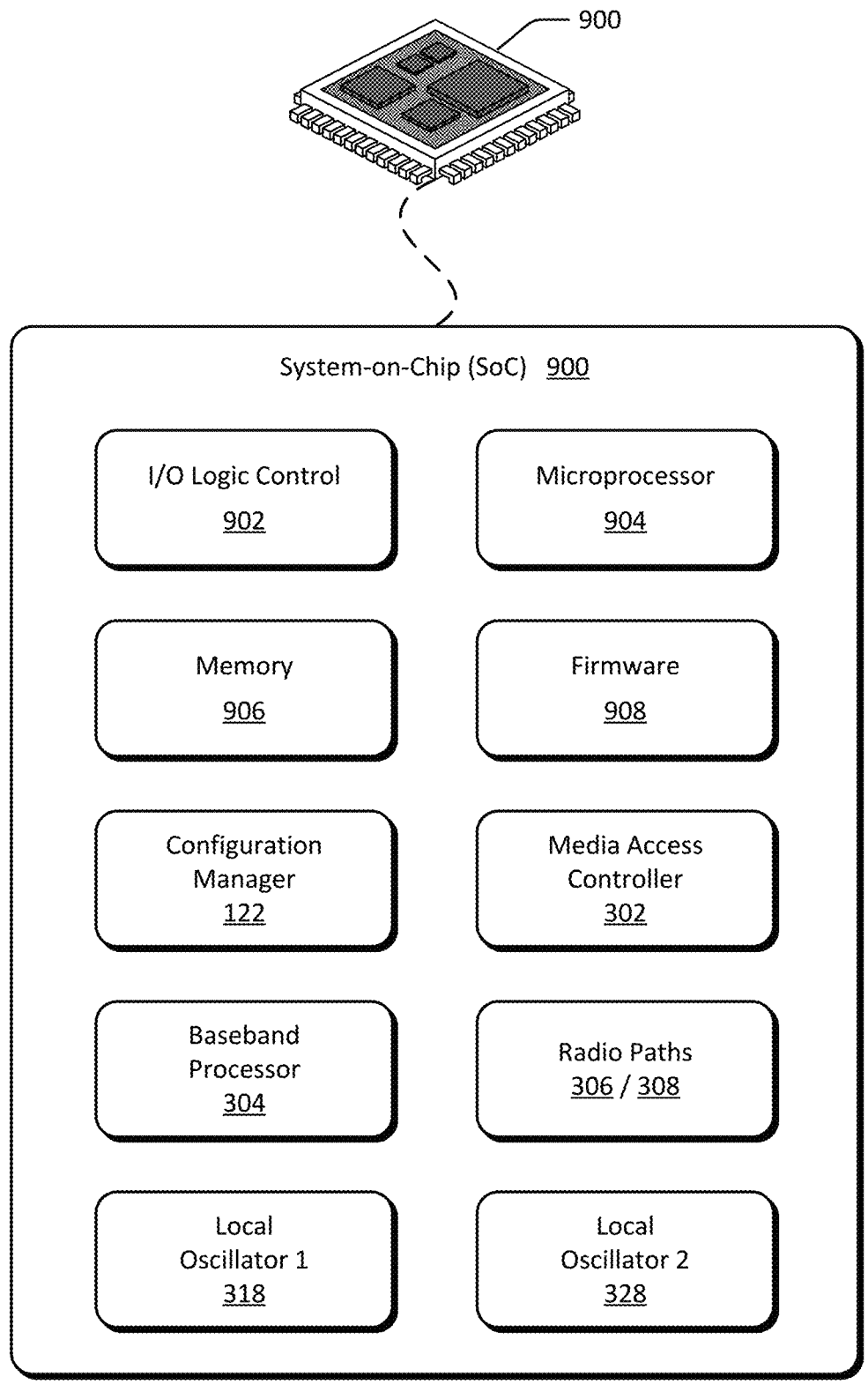
FIG. 9 illustrates an example System-on-Chip (SoC) environment in which components of a configurable wireless communication chip can be embodied.

FIG. 9 illustrates an exemplary System-on-Chip (SoC) 900 in which components and/or aspects of a configurable wireless communication chip can be implemented. The SoC 900 can be implemented in any suitable device, such as an access point, wireless router, mesh network node, set-top box, wireless base station, drone controller, server, mesh networking node, vehicle-based networking system, network-attached storage, smart appliance, gaming console, home automation system, or any other suitable type of device. Although described with reference to a SoC, the entities of FIG. 9 may also be implemented as a network interface controller (NIC), system-in-package (SiP), application-specific standard part (ASSP), digital signal processor (DSP), programmable SoC (PSoC), or field-programmable gate array (FPGA).

The SoC 900 can be integrated with electronic circuitry, a microprocessor, memory, input-output (I/O) logic control, communication interfaces, other hardware, firmware, and/or software useful to provide functionalities of a device, such as any of the devices listed herein. The SoC 900 may also include an integrated data bus or connection fabric (not shown) that couples the various components of the SoC for data communication between the components. The integrated data bus or other components of the SoC 900 may be exposed to or enable access of external components, such as for wireless communication. For example, the SoC 900 may be implemented with a baseband processor or modem component for managing or controlling a transceiver (internal or external) or other hardware to communicate over a wireless medium.

In this example, the SoC 900 includes various components such as input-output (I/O) logic control 902 (e.g., to include electronic circuitry) and a microprocessor 904 (e.g., any of a microcontroller, processor core, application processor, or DSP). The SoC 900 also includes memory 906, which can be any type and/or combination of RAM, SRAM, DRAM, low-latency nonvolatile memory, ROM, one-time programmable (OTP) memory, and/or other suitable electronic data storage. In the context of this disclosure, the memory 906 stores data, instructions, or other information via non-transitory signals, and does not include carrier waves or other transitory signals.

Alternately or additionally, the SoC 900 may comprise a data interface (not shown) for accessing additional or expandable off-chip memory, such as external SRAM or flash memory. In some cases, the SoC 900 includes various applications, operating systems, and/or software, such as firmware 908, which can be computer-executable instructions maintained by the memory 906 and executed by the microprocessor 904. In this example, the SoC 900 also includes components of a configurable wireless communication chip to facilitate wireless communication in accordance with one or more aspects. Generally, these components may be implemented separately or combined with other components of the SoC 900, such as the I/O logic control 902, microprocessor 904, memory 906, or firmware 908.

As shown in FIG. 9, the SoC 900 includes a configuration manager 122, media access controller 302 (MAC 302), and baseband processor 304, which may be embodied as disparate or combined components, as described in relation to aspects presented herein. The SoC 900 may also include radio paths 306 and 308, a first local oscillator 318, and a second oscillator 328. Examples of these components and/or entities, and their corresponding functionality, are described with reference to the respective components of the environment 100 shown in FIG. 1, wireless network shown in FIG. 2, and example component configurations of FIGS. 3-6. Further, although described with reference to components of a host device 102, an SoC 900 may also be implemented as and with components of a client device 104 of the environment 100 or another wireless platform. The configuration manager 122, either in whole or part, can be implemented as processor-executable instructions (e.g., firmware 908) maintained by the memory 906 and executed by the microprocessor 904 and/or the baseband processor 304 to implement various aspects and/or features of a configurable wireless communication chip.

The configuration manager 122, either independently or in combination with other entities, can be implemented with any suitable combination of components or circuitry to implement various aspects and/or features described herein. The configuration manager 122 may also be provided integral with other entities of the SoC 900, such as integrated with the I/O logic control 902, microprocessor 904, MAC 302, baseband processor 304, or a transceiver interface of the SoC 900. Alternately or additionally, the configuration manager 122, configuration settings 126 (e.g., registers, not shown), or the other components can be implemented as hardware, firmware, fixed logic circuitry, or any combination thereof.

Although the subject matter has been described in language specific to structural features and/or methodological operations, it is to be understood that the subject matter defined in the appended claims is not necessarily limited to the specific features or operations described herein, including orders in which they are performed.

What is claimed is:

1. A method implemented by a wireless communication chip, the method comprising:
   determining a hardware configuration of a device in which the wireless communication chip is embodied, the hardware configuration including a number of multiple antennas of the device or a number of multiple amplifier paths of the device operably coupled to radio paths of the wireless communication chip, the radio paths including a first set of radio paths and a second set of radio paths that comprise an N number of total radio paths;
   determining, based on the hardware configuration of the device, that the wireless communication chip is to operate in one of:
   (i) a first communication mode that supports communication in non-contiguous segments of wireless spectrum having a predefined bandwidth based on the number of the multiple antennas or the number of the multiple amplifier paths being equal to N; and
   (ii) a second communication mode that does not support communication in non-contiguous segments of wireless spectrum having the predefined bandwidth based on the number of the multiple antennas or the number of the multiple amplifier paths being fewer than N;
   configuring, based on the determined communication mode in which the wireless communication chip is to operate, the radio paths of the wireless communication chip to operate in the first communication mode or the second communication mode; and
   (i) if the radio paths are configured to operate in the first communication mode, communicating via the first communication mode with at least one remote device via two non-contiguous segments of wireless spectrum, or
   (ii) if the radio paths are configured to operate in the second communication mode, communicating via the second communication mode with the at least one remote device via two contiguous segments of spectrum.

2. The method as recited in claim 1, wherein configuring the radio paths of the wireless communication chip to operate in the second communication mode comprises setting at least two local oscillators associated with the radio paths to operate in adjacent segments of wireless spectrum of the predefined bandwidth.

3. The method as recited in claim 1, wherein configuring the radio paths of the wireless communication chip to operate in the second communication mode comprises configuring at least two of the radio paths to use common gain control for respective variable-gain amplifiers of the at least two radio paths.

4. The method as recited in claim 1, wherein communicating via the second communication mode comprises combining signals provided by two of the radio paths of the wireless communication chip to provide a combined signal and amplifying the combined signal with one of the multiple amplifier paths for transmission via one of the multiple antennas.

5. The method as recited in claim 1, wherein communicating via the second communication mode comprises amplifying, with one of the multiple amplifier paths, a signal received via a one of the multiple antennas to provide an amplified signal and separating the amplified signal to provide two signals for receive processing by two of the radio paths of the wireless communication chip.

6. The method as recited in claim 1, wherein determining the hardware configuration of the device comprises one of:
   reading in input of the wireless communication chip to determine the hardware configuration of the device;
   accessing a register of the wireless communication chip to determine the hardware configuration of the device; or
   performing a radio path test to determine the hardware configuration of the device.

7. The method as recited in claim 1, further comprising communicating, via the wireless communication chip, in accordance with the Institute of Electrical and Electronics Engineers (IEEE) 802.11ac or IEEE 802.11ax standard.

8. The method as recited in claim 1, wherein:
   the predefined bandwidth of the non-contiguous segments of wireless spectrum is 80 MHz or 160 MHz; or
   the predefined bandwidth of the contiguous segments of wireless spectrum is 80 MHz or 160 MHz.

9. A System-on-Chip (SoC) comprising:
   a baseband processor to manage wireless communication;
   a first set of radio paths to transmit or receive a first set of spatial streams;
   a first local oscillator operably coupled with the first set of radio paths;

a second set of radio paths to transmit or receive a second set of spatial streams, the first set of radio paths and the second set of radio paths comprising an N number of total radio paths;

a second local oscillator operably coupled with the second set of radio paths; and a communication configuration manager configured to:
  determine a hardware configuration external to the SoC, the hardware configuration including a number of multiple antennas or a number of multiple amplifier paths operably coupled to the first set of radio paths or the second set of radio paths of the SoC;
  determine, based on the hardware configuration external to the SoC, that the SoC is to operate in one of:
    (i) a first communication mode that supports communication in non-contiguous segments of wireless spectrum having a predefined bandwidth based on the number of the multiple antennas or the number of the multiple amplifier paths being equal to N; and
    (ii) a second communication mode that does not support communication in non-contiguous segments of wireless spectrum having the predefined bandwidth based on the number of the multiple antennas or the number of the multiple amplifier paths being fewer than N; and
  configure, based on the determined communication mode in which the SoC is to operate, the first local oscillator operably coupled with the first set of radio paths or the second local oscillator operably coupled with the second set of radio paths to operate in accordance with the first communication mode or in accordance with the second communication mode.

10. The SoC as recited in claim 9, wherein to configure the first local oscillator or the second local oscillator to operate in the second communication mode, the communication configuration manager configures the first local oscillator and the second local oscillator to operate in adjacent segments of wireless spectrum of the predefined bandwidth.

11. The SoC as recited in claim 9, wherein the communication configuration manager is further configured to, in response to determining that the SoC is to operate in the second communication mode, configure respective gain control for variable-gain amplifiers of at least two of the radio paths to operate with a common gain control setting.

12. The SoC as recited in claim 9, wherein to determine the hardware configuration external to the SoC, the communication configuration manager is further configured to:
  read an input of the SoC to determine the hardware configuration external to the SoC;
  access a register of the SoC to determine the hardware configuration external to the SoC; or
  perform a radio path test of the first set of radio paths or the second set of radio paths to determine the hardware configuration external to the SoC.

13. The Soc as recited in claim 9, wherein the SoC is configured to communicate in accordance with the Institute of Electrical and Electronics Engineers (IEEE) 802.11ac or IEEE 802.11ax standard.

14. The SoC as recited in claim 9, wherein:
  the predefined bandwidth of the non-contiguous segments of wireless spectrum is 80 MHz or 160 MHz; or
  the predefined bandwidth of the contiguous segments of wireless spectrum is 80 MHz or 160 MHz.

15. An apparatus comprising:
  multiple antennas by which signals are transmitted or received;
  multiple amplifier paths each configured to amplify signals for transmission by one of the multiple antennas or amplify signals received by one of the multiple antennas;
  a wireless communication chip comprising:
  a first set of multiple radio paths;
  a second set of multiple radio paths, the first set of radio paths and the second set of radio paths comprising an N number of total radio paths; and
  a communication configuration manager configured to:
    determine, based on a number of the multiple antennas or a number of the multiple amplifier paths, that the wireless communication chip is to operate in one of:
      (i) a first communication mode that supports communication in non-contiguous segments of wireless spectrum having a predefined bandwidth based on the number of the multiple antennas or the number of the multiple amplifier paths being equal to N; and
      (ii) a second communication mode that does not support communication in non-contiguous segments of wireless spectrum having the predefined bandwidth based on the number of the multiple antennas or the number of the multiple amplifier paths being fewer than N; and
    configure, based on the determination, the first set of radio paths and the second set of radio paths to operate in accordance with the first communication mode or in accordance with the second communication mode.

16. The apparatus as recited in claim 15, wherein to configure the first set of radio paths and the second set of radio paths to operate in accordance with the second communication mode, the communication configuration manager is further configured to set at least two local oscillators associated with the radio paths to operate in adjacent segments of wireless spectrum of the predefined bandwidth.

17. The apparatus as recited in claim 15, wherein to configure the first set of radio paths and the second set of radio paths to operate in accordance with the second communication mode, the communication configuration manager is further configured to configure at least two of the radio paths to use common gain control for respective variable-gain amplifiers of the at least two radio paths.

18. The apparatus as recited in claim 15, wherein to determine the number of the multiple antennas or the number of the multiple amplifier paths, the communication configuration manager is further configured to:
  read an input of the wireless communication chip to determine the number of the multiple antennas or the number of the multiple amplifier paths;
  access a register of the wireless communication chip to determine the number of the multiple antennas or the number of the multiple amplifier paths; or
  perform a radio path test of the first set of radio paths or the second set of radio paths to determine the number of the multiple antennas or the number of the multiple amplifier paths.

19. The apparatus as recited in claim 15, wherein the wireless communication chip is configured to communicate in accordance with the Institute of Electrical and Electronics Engineers (IEEE) 802.11ac or IEEE 802.11ax standard.

20. The apparatus as recited in claim 15, wherein:
  the predefined bandwidth of the non-contiguous segments of wireless spectrum is 80 MHz or 160 MHz; or the predefined bandwidth of the contiguous segments of wireless spectrum is 80 MHz or 160 MHz.

\* \* \* \* \*